(12) United States Patent
Li et al.

(10) Patent No.: US 9,652,208 B2
(45) Date of Patent: May 16, 2017

(54) COMPILER AND METHOD FOR GLOBAL-SCOPE BASIC-BLOCK REORDERING

(71) Applicant: Futurewei Technologies, Inc., Plano, TX (US)

(72) Inventors: Pengcheng Li, Rochester, NY (US); Ziang Hu, Union City, CA (US); Handong Ye, Union City, CA (US)

(73) Assignee: Futurewei Technologies, Inc., Plano, TX (US)

( * ) Notice: Subject to any disclaimer, the term of this patent is extended or adjusted under 35 U.S.C. 154(b) by 281 days.

(21) Appl. No.: 14/445,983

(22) Filed: Jul. 29, 2014

(65) Prior Publication Data

US 2015/0040106 A1    Feb. 5, 2015

Related U.S. Application Data

(60) Provisional application No. 61/861,262, filed on Aug. 1, 2013.

(51) Int. Cl.
*G06F 9/44* (2006.01)
*G06F 9/45* (2006.01)
*G06F 11/36* (2006.01)

(52) U.S. Cl.
CPC ............. *G06F 8/443* (2013.01); *G06F 8/425* (2013.01); *G06F 8/436* (2013.01); *G06F 8/447* (2013.01); *G06F 11/3636* (2013.01); *G06F 11/3684* (2013.01)

(58) Field of Classification Search
USPC ....................................................... 717/130
See application file for complete search history.

(56) References Cited

U.S. PATENT DOCUMENTS

| | | | | |
|---|---|---|---|---|
| 5,557,761 A | * | 9/1996 | Chan | G06F 8/445 717/144 |
| 5,889,999 A | * | 3/1999 | Breternitz, Jr. | G06F 8/445 712/201 |
| 6,049,666 A | * | 4/2000 | Bennett | G06F 11/323 714/E11.181 |
| 6,126,329 A | * | 10/2000 | Bennett | G06F 11/323 714/35 |
| 6,289,507 B1 | * | 9/2001 | Tanaka | G06F 8/443 717/155 |

(Continued)

FOREIGN PATENT DOCUMENTS

CN    1176426 A    3/1998
CN    101339519 A    1/2009

OTHER PUBLICATIONS

Curtsinger et al., "Stabilizer: Statistically Sound Performance Evaluation," SIGPLAN No. 48, Mar. 4, 2013, pp. 219-228.

(Continued)

*Primary Examiner* — Marina Lee
(74) *Attorney, Agent, or Firm* — Slater Matsil, LLP (57) ABSTRACT

An embodiment method of global scope basic-block reordering includes profiling an application having a source code decomposable into a plurality of basic-blocks. The profiling yields a global basic-block sequence. The method also includes generating a hierarchical locality model according to the global basic-block sequence. The method also includes generating a target code according to the hierarchical locality model.

20 Claims, 5 Drawing Sheets

(56) References Cited

U.S. PATENT DOCUMENTS

| | | | |
|---|---|---|---|
| 6,594,824 B1* | 7/2003 | Volkonsky | G06F 8/445 707/999.005 |
| 6,934,935 B1* | 8/2005 | Bennett | G06F 11/323 714/E11.181 |
| 8,418,149 B2* | 4/2013 | Krauss | G06F 11/3636 717/127 |
| 2004/0255279 A1* | 12/2004 | Rawsthorne | G06F 9/45516 717/136 |
| 2006/0041875 A1* | 2/2006 | Peri | G06F 8/443 717/151 |
| 2007/0277162 A1 | 11/2007 | Tanaka et al. | |
| 2011/0138372 A1* | 6/2011 | Damron | G06F 8/441 717/154 |
| 2013/0055226 A1* | 2/2013 | Hayashizaki | G06F 11/3612 717/158 |
| 2015/0040106 A1* | 2/2015 | Li | G06F 8/425 717/130 |

OTHER PUBLICATIONS

Gloy et al., "Procedure Placement Using Temporal Ordering Information," In MICRO-30 International Symposium on Microarchitecture, Dec. 1-3, 1997, 11 pgs.

Gunther et al., "Assessing Cache False Sharing Effects by Dynamic Binary Instrumentation," Proceedings of the Workshop on Binary Instrumentation and Applications (WBIA), Dec. 12, 2009, pp. 26-33.

Huang et al., "Dynamic Code Management: Improving Whole Program Code Locality in Managed Runtimes," Proceedings of the 2nd International Conference on Virtual Execution Environments, Jun. 14-16, 2006, Ottawa, Ontario, Canada, pp. 133-143.

Jiang et al., "Array Regrouping on CMP with Non-Uniform Cache Sharing," Proceedings of the 23rd International Conference on Languages and Compilers for Parallel Computing (LCPC'10), Oct. 7-9, 2010, 15 pgs.

Liu et al., "Basic-block Reordering Using Neural Networks," SMART Jan. 2007, 15 pgs.

Mytkowicz et al., "Producing Wrong Data Without Doing Anything Obviously Wrong!" ASPLOS'09, ACM, Mar. 2009, pp. 265-276.

Sarkar et al., "Compiler Techniques for Reducing Data Cache Miss Rate on a Multithreaded Architecture," Proceedings of the 3rd International Conference on High Performance Embedded Architectures and Compilers (HiPEAC'08), LNCS 4917, Jan. 2008, pp. 353-368.

International Search Report and Written Opinion of the International Searching Authority received in Patent Cooperation Treaty Application No. PCT/CN2014/083517, mailed Nov. 4, 2014, 12 pages.

* cited by examiner

COMPILER AND METHOD FOR GLOBAL-SCOPE BASIC-BLOCK REORDERING

This application claims the benefit of U.S. Provisional Application No. 61/861,262, filed on Aug. 1, 2013, entitled "A Profiling-Based Static Basic-Block-Level Global Scope Code Layout System and Method," which application is hereby incorporated herein by reference.

TECHNICAL FIELD

The present invention relates generally to optimizing code layout, and, in particular embodiments, to a system and method for global-scope basic-block reordering.

BACKGROUND

Computer storage infrastructure often includes cache and memory. Cache generally includes at least one layer and often several layers of cache. The highest layer of cache is referred to as the L1 cache and is generally the smallest and fastest. The next layer would be the L2 cache, and so on. The lowest level of cache is sometimes referred to as the last-level cache, which is typically the largest and slowest. Cache generally includes a data cache and an instruction cache. When executing an application, application code is pulled into the instruction cache. The application code brings along data that is stored in the data cache. The last-level cache is sometimes shared by data and instructions. As execution of the application proceeds, instructions are pulled into the cache, executed, and flushed from the cache to make room for more instructions. If the instructions needed for execution are already in the cache, no flush is necessary, which is referred to as a cache hit. Otherwise, when the next instruction is not already in cache, it is referred to as a cache miss. A cache that is flushed less frequently generally performs more efficiently. For a given program's performance, the instruction cache is the most important component of the storage infrastructure.

Much research is devoted to improving utilization of the instruction cache. Code layout is an effective way to optimize using a compiler. Code layout refers to a variety of code-changing mechanisms, including inline functions, function cloning, function reordering, basic-block reordering, stack frame changing, and others. Recent literature reflects the realization that code layout can significantly impact performance. More specifically, the impact of changing the size of environment variables can be quite dramatic. For more information regarding this impact, refer to T. Mytkowicz, A. Diwan, M. Hauswirth, and P. F. Sweeney, Producing Wrong Data Without Doing Anything Obviously Wrong! ASPLOS '09, pp. 265-276, ACM, 2009, which is hereby incorporated herein by reference. Additionally, changing the link order of object files can also impact performance. For more information regarding this impact, refer to Charlie Curtsinger and Emery D. Berger, STABILIZER: statistically sound performance evaluation, SIGPLAN Not. 48, 4 (March 2013), 219-228, which is hereby incorporated herein by reference.

SUMMARY

An embodiment method of global scope basic-block reordering includes profiling an application having a source code decomposable into a plurality of basic-blocks. The profiling yields a global basic-block sequence. The method also includes generating a hierarchical locality model according to the global basic-block sequence. The method also includes generating a target code according to the hierarchical locality model.

An embodiment compiler includes a first stage, an optimizer, and a code generator. The first stage is configured to translate a source code having a plurality of basic-blocks into an intermediate representation. The optimizer is configured to profile the intermediate representation. The profiling yields a global basic-block sequence. The optimizer is further configured to generate a hierarchical locality model according to the global basic-block sequence. The code generator is configured to generate a target code ordered according to the hierarchical locality model.

An embodiment computing system includes a non-transitory memory and a processor. The non-transitory memory is configured to store a source code, an intermediate representation of the source code, a testing code, a hierarchical locality model, and a target code. The source code is decomposable into a plurality of basic-blocks. The testing code is generated according to the intermediate representation and includes instrumentation code. The hierarchical locality model represents respective affinities between each unique pair of the plurality of basic-blocks. The target code is generated according to the intermediate representation and the hierarchical locality model. The processor is configured to translate the source code into the intermediate representation. The processor is further configured to insert the instrumentation code into the intermediate representation. The processor is further configured to generate and execute the testing code. The processor is further configured to collect global basic-block execution traces resulting from the execution of the testing code. The processor is further configured to determine the respective affinities according to the global basic-block execution traces to generate the hierarchical locality model. The processor is further configured to generate the target code.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

Some code layout techniques operate at run-time, such as the code tiling model described by Huang et al., see Xianglong Huang, Brian T Lewis, Kathryn S McKinley, Dynamic Code Management: improving whole program code locality in managed runtimes, Proceedings of the 2nd international conference on Virtual execution environments, Jun. 14-16, 2006, Ottawa, Ontario, Canada, which is hereby incorporated herein by reference. Another run-time technique uses a statistical technique to randomly change code layout at a functional level during run-time, see supra Curtsinger.

Basic-block reordering is another optimization that allows the number of ineffective flushes caused by conditional jumps to be reduced. The reordering improves instruction cache performance and decreases the number of unconditional jump executions, which are both advantages over function-level code layout mechanisms. A source code for a given application includes many executable lines of code containing various instructions and spanning many functions. A basic-block is a unit of sequentially executed instructions having one entry point and one exit point. Early in compilation, source code is typically decomposed into its basic-blocks, which are more amenable to analysis.

One approach to basic-block reordering uses function-scope basic-block reordering and is further described by Liu et al.; see Xianhua Liu, Jiyu Zhang, Kun Liang, Yang Yang and Xu Cheng, Basic-block Reordering Using Neural Networks, SMART'07, which is hereby incorporated herein by reference.

Another code layout technique uses a greedy reordering and is further described by Gloy et al.; see N. Gloy, T. Blackwell, M. Smith, and B. Calder, Procedure Placement Using Temporal Ordering Information, MICRO-30 International Symposium on Microarchitecture, December 1997, which is hereby incorporated herein by reference.

Data layout optimization is another approach sometimes used to improve cache efficiency. Sarkar et al. describes a data-cache aware compilation technique for multithreaded architectures and layout data objects that aims to minimize inter-object conflict misses, see Subhradyuti Sarkar and Dean M. Tullsen, Compiler Techniques for Reducing Data Cache Miss Rate on a Multithreaded Architecture, Proceedings of the 3rd International Conference on High Performance Embedded Architectures and Compilers (HiPEAC 2008), which is hereby incorporated herein by reference.

Another data layout technique, array regrouping, uses non-uniform cache sharing, which is further described by Jiang et al., see Yunlian Jiang, Eddy Z. Zhang, Xipeng Shen, Yaoqing Gao, and Roch Archambault, Array Regrouping on CMP with Non-Uniform Cache Sharing, Proceedings of the 23rd international conference on Languages and compilers for parallel computing (LCPC 2010), which is hereby incorporated herein by reference.

For further discussion of the impact of data layout, refer to Stephan M. Gunther and Josef Weidendorfer, Assessing Cache False Sharing Effects by Dynamic Binary Instrumentation, Proceedings of the Workshop on Binary Instrumentation and Applications, 2009, which is hereby incorporated herein by reference.

Figure 1:
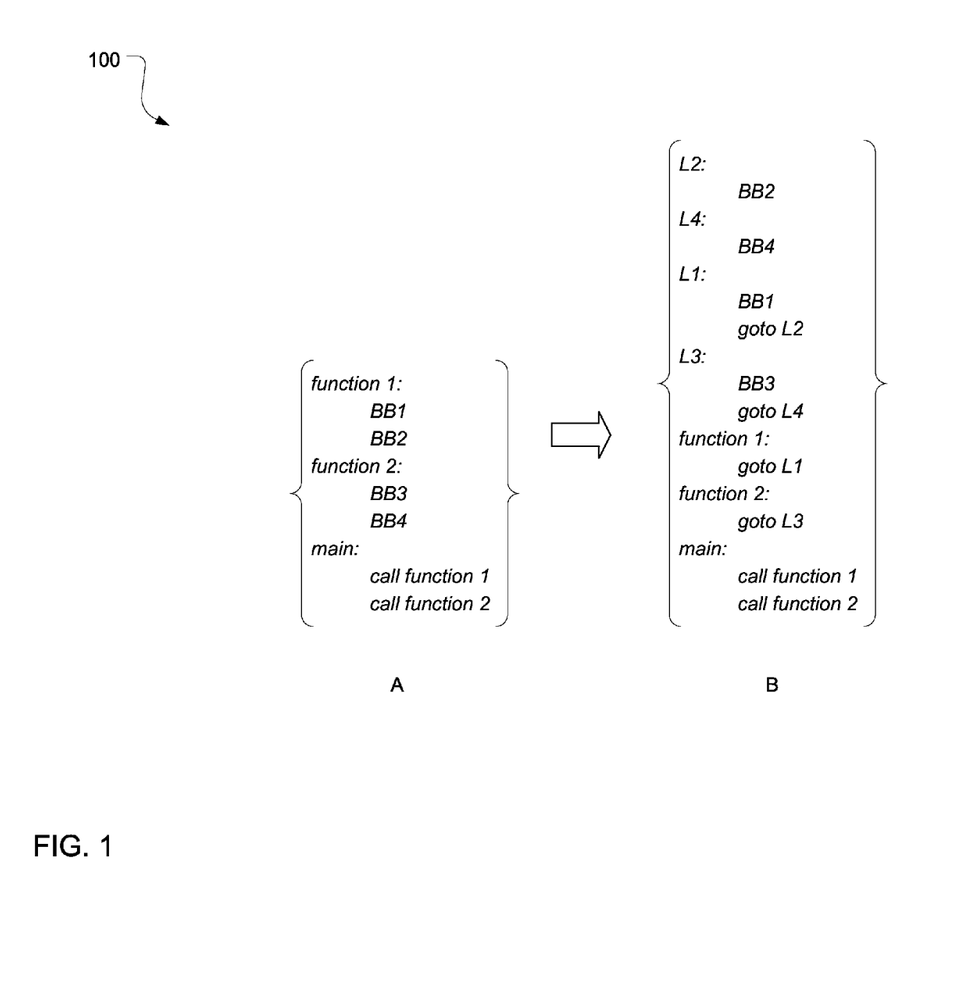
FIG. 1 is an illustration of global-scope basic-block reordering.

FIG. 1 illustrates one example of a global-scope basic-block reordering 100 according to an embodiment of the compiler or method for global-scope basic-block reordering introduced herein. FIG. 1-A illustrates an original code layout in a memory space. The original code includes a function 1 and a function 2 that are both called by a main function. Function 1 includes two basic-blocks, which are represented by BB1 and BB2, Likewise, function 2 includes two basic-blocks, which are represented by BB3 and BB4, FIG. 1-B illustrates a reordered code in the memory space, which further recognizes that BB 1 and BB2 are called sequentially and that BB3 and BB4 are called sequentially. Each of the basic-blocks has a corresponding label indicating the beginning of that basic-block in the memory space. FIG. 1-B also illustrates that, although BB2 and BB4 are parts of different functions, they are neighbors in memory, i.e., ordered, due to their like affinities. The same is true for basic-blocks BB1 and BB3.

Figure 2:
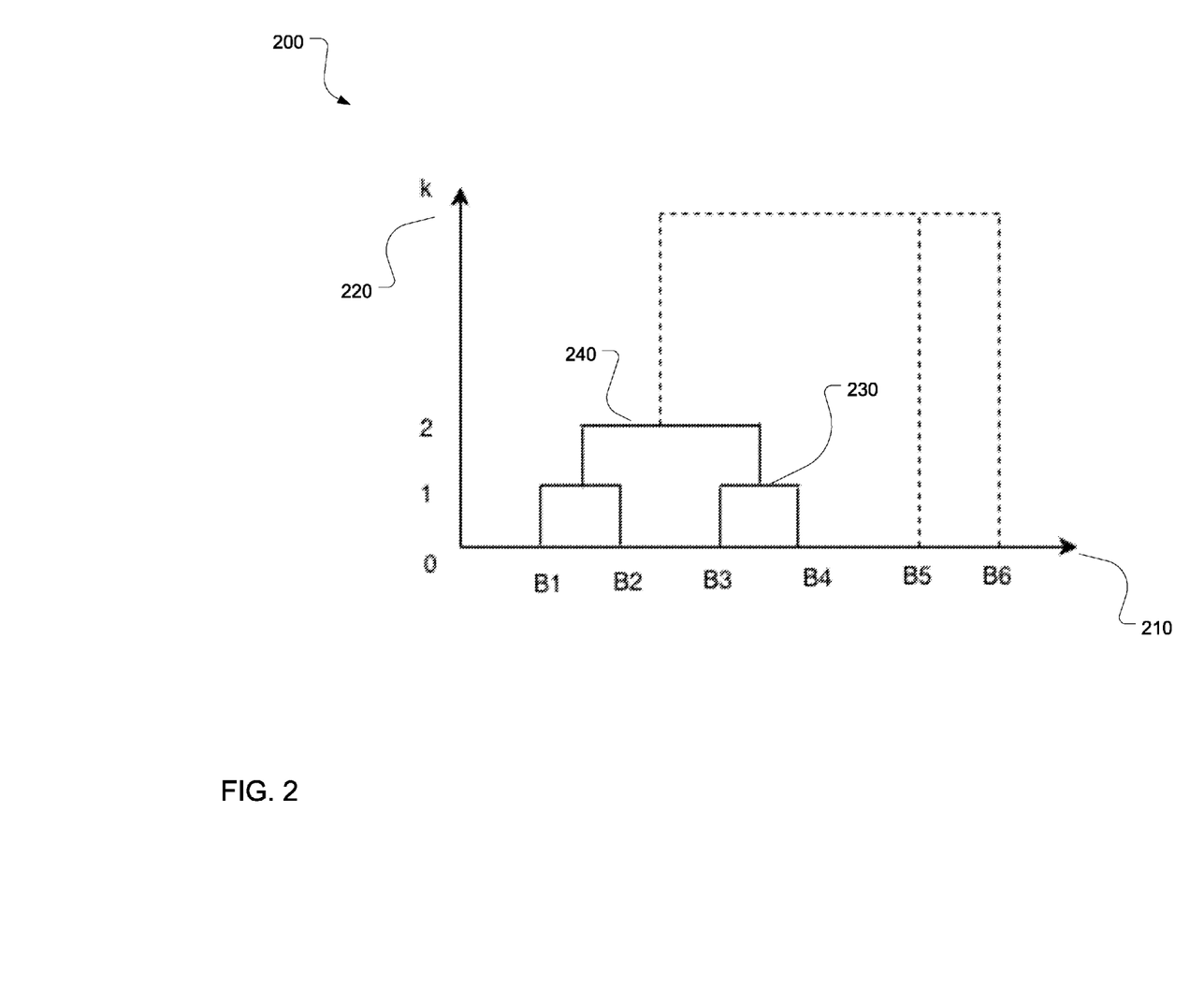
FIG. 2 is an illustration of one embodiment of a hierarchical locality model.

FIG. 2 is an illustration of one embodiment of a hierarchical locality model 200. Hierarchical locality model 200 is expressed in terms of basic-blocks and an affinity distance, which is sometimes referred to simply as affinity, and also sometimes referred to as "k." The basic-blocks are shown horizontally along a basic-block axis 210. The affinity distance is shown vertically along a k-axis 220. Affinity refers to a minimum number of distinct basic-block calls between a given pair of basic-blocks. A basic-block would have an affinity of zero with itself and an affinity of one with another basic-block called sequentially, as in called immediately before or after. In the embodiment of FIG. 2, hierarchical locality model 200 represents affinities of six basic-blocks, B1, B2, B3, B4, B5, and B6.The affinities are determined from a basic-block execution trace, which is a sequence of accesses to basic-blocks B1 through B6, One example of a basic-block sequence is B1 B2 B3 B4 B2 B5.

Continuing the embodiment of FIG. 2, hierarchical locality model 200 shows that basic-block B3 and basic-block B4 are separated by as few as one distinct basic-block call, which is represented by an affinity of one 230. In other words, basic-blocks B3 and B4 are called sequentially. The same is true for basic-blocks B1 and B2.

Hierarchical locality model 200 also shows that there are as few two distinct basic-block calls between a first group of basic-blocks and a second group of basic-blocks, where the first group includes basic-blocks B1 and B2 and the second group includes basic-blocks B3 and B4. The first and second groups have an affinity of two 240.

Figure 3:
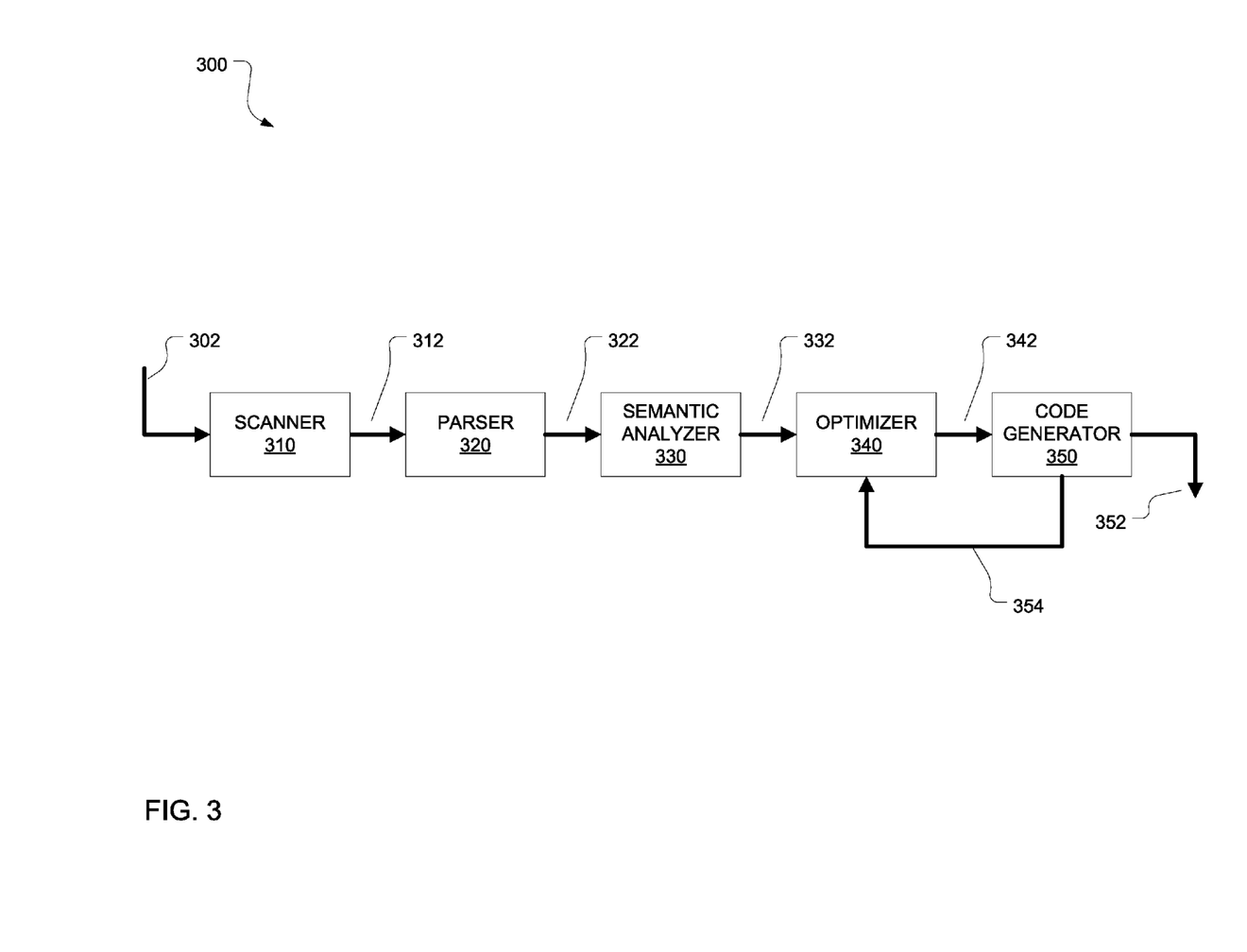
FIG. 3 is a block diagram of one embodiment of a compiler.

FIG. 3 is a block diagram of one embodiment of a compiler 300 within which the compiler or method for global-scope basic-block reordering introduced herein may be embodied or carried out. Compiler 300 includes a scanner 310, a parser 320, a semantic analyzer 330, an optimizer 340, and a code generator 350. Scanner 310, parser 320, semantic analyzer 330, optimizer 340, and code generator 350 can be implemented in one or more processors, one or more application specific integrated circuits (ASICs), one or more field-programmable gate arrays (FPGAs), dedicated logic circuitry, or any combination thereof, all collectively referred to as a processor. The respective functions for scanner 310, parser 320, semantic analyzer 330, optimizer 340, and code generator 350 can be stored as instructions in non-transitory memory for execution by the processor.

Scanner 310 uses lexical analysis to translate a source code 302 for an application from a sequence of characters to a sequence of tokens 312. Parser 320 parses sequence of tokens 312 into a syntax tree 322. Semantic analyzer 330 uses contextual analysis to check semantics and annotate the syntax tree. The output of semantic analyzer 330 is an intermediate representation 332 of source code 302.

Optimizer 340 carries out various code optimization steps before passing an optimized intermediate representation 342 over to code generator 350. Code generator 350 then generates a target code 352.

Optimizer 340 includes a profiler having a compile-time module and a run-time module. The compile-time module inserts instrumentation code into intermediate representation 332. The compile-time module reviews each basic-block in the application and inserts a function call that will execute at run-time. Intermediate representation 332, including the instrumentation code, is then passed to code generator 350. Code generator 350 generates a testing code 354 that can be executed by a processor. During execution of testing code 354, the run-time module is responsible for collecting global basic-block execution traces that result from the execution of the instrumentation function calls. The global basic-block execution traces can include a variety of basic-block information, including name, label, and position, among others.

In certain embodiments, the compile-time module can also sample the collected global basic-block execution traces. This is sometimes useful when volume of data collected by the run-time module in the global basic-block execution traces is large. Basic-block sequences can then be generated from the samples.

Figure 4:
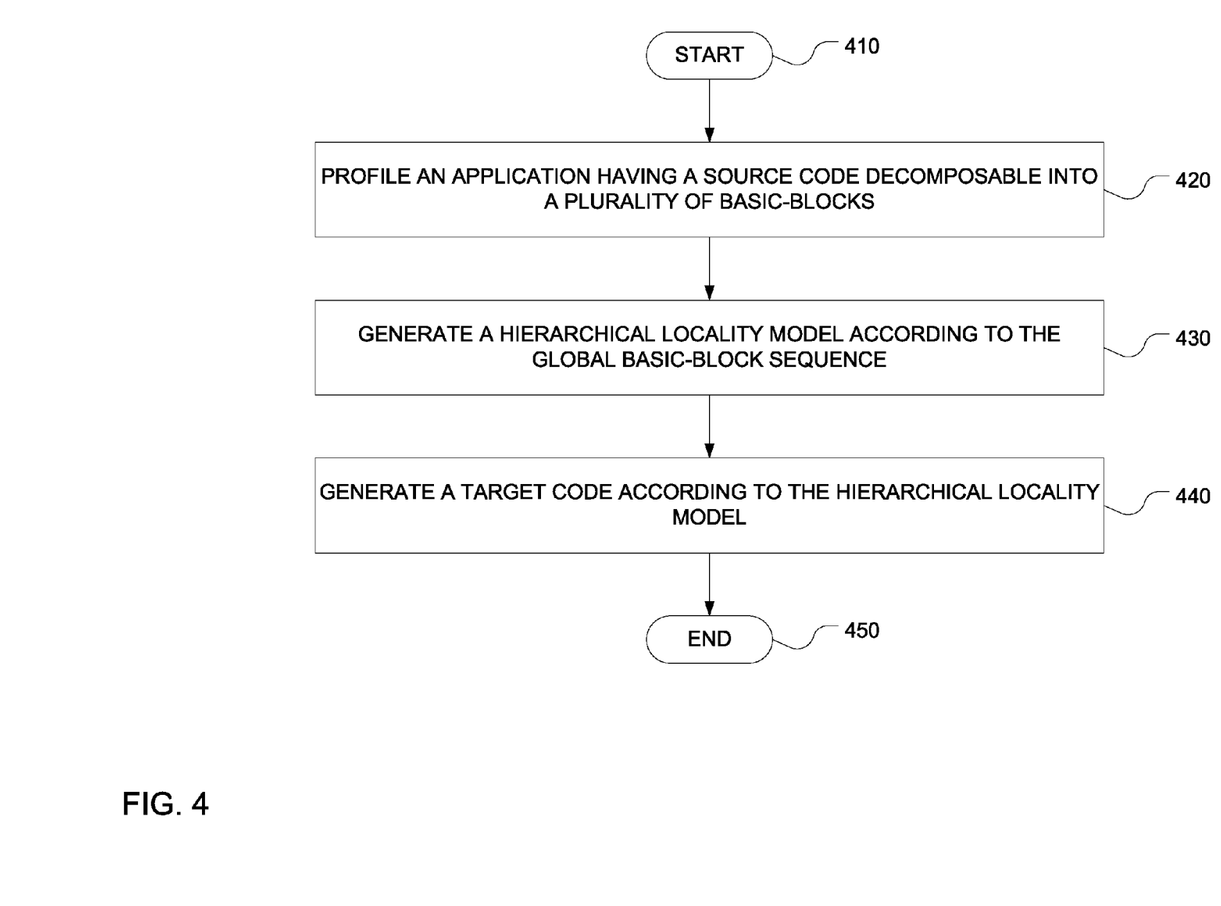
FIG. 4 is a flow diagram of one embodiment of a method of global-scope basic-block reordering.

Optimizer 340 also includes a modeler that generates a hierarchical locality model from the basic-block sequences generated by the profiler. The hierarchical locality model represents the affinity between each distinct pair of basic- At a modeling step 430, the global basic-block sequences are used to create a hierarchical locality model for the application. The hierarchical locality model includes an affinity between each unique pair of basic-blocks in the application. The affinity between two basic-blocks is the minimum number of basic-block calls between them. For example, consider a basic-block sequence B1-B2-B3-B4. In this brief first example, the affinity between B1 and B2 is one, the affinity between B1 and B3 is two, and the affinity between B1 and B4 is three. In another example, consider a basic-block sequence B1-B2-B3-B4-B2. In this second example, the affinity between B1 and B2 is still one, but the affinity between B2 and B4 is also one, whereas the affinity between B2 and B4 in the first example would be two. The basic-blocks are grouped according to their respective affinities. The table below illustrates one embodiment of a procedure for computing a hierarchical locality model.

TABLE 1

Procedure for Computing Hierarchical Locality Model

INPUT: A basic-block trace, length N, of which the number of distinct basic-blocks is M
OUTPUT: A reordered basic-block sequence
while k from 1 to infinity do
   initialize an empty set of groups
   while there exist basic-blocks not grouped do
     randomly pick one basic-block A from the remaining ungrouped basic-blocks
     for each existed basic-block group G
       add to G if every basic-block B in G such that dis<A,B> <= k
     endfor
     if basic-block A not added to any existed groups
       create a new group and add A in
     endif
   endwhile
endwhile blocks in the application. The basic-blocks are then grouped according to their affinity. For example, all basic-blocks having an affinity of one are proximately grouped; all basic-blocks having an affinity of two are proximately grouped; and so on. Code generator 350 generates target code 352 using intermediate representation 342 and the hierarchical locality model.

FIG. 4 is a flow diagram of one embodiment of a method of global-scope basic-block reordering. The method begins at a start step 410. An application is profiled at a profiling step 420. The application has a source code that is decomposable into a plurality of basic-blocks. Profiling step 420 generates global basic-block sequences. Profiling step 420 includes a compile time phase and a run-time phase. During the compile-time phase, a profiler reviews each basic-block in the application and inserts instrumentation code, i.e., function calls that will report out basic-block information when executed in run-time. A testing code is then generated that includes the instrumentation function calls. During the run-time, when the testing code is executed, global basic-block execution traces are collected into memory. The global basic-block sequences are generated from these global basic-block execution traces. In certain embodiments, where the volume of data reported out during execution of the testing code is large, the global basic-block execution traces can be sampled to reduce the overhead of forming the global basic-block sequences and later the creation of the hierarchical locality model. The global basic-block traces are then generated from the samples.

At a code generation step 440, the hierarchical locality model is used to generate a target code that is reordered in global scope. Code generation can be carried out by a variety of code generation modules, such as the AsmPrinter module. The code generator outputs assembly codes after performing compiler optimizations. The code generator is separated from the rest of the compiler and is configured to generate assembly codes in a global scope. The code generator first outputs the reordered basic-blocks according to the hierarchical locality module. Then the code generator outputs the remaining information, including function headers, function tails, global data, and other symbols sometimes necessary for an assembly file. The method ends at an end step 450.

Figure 5:
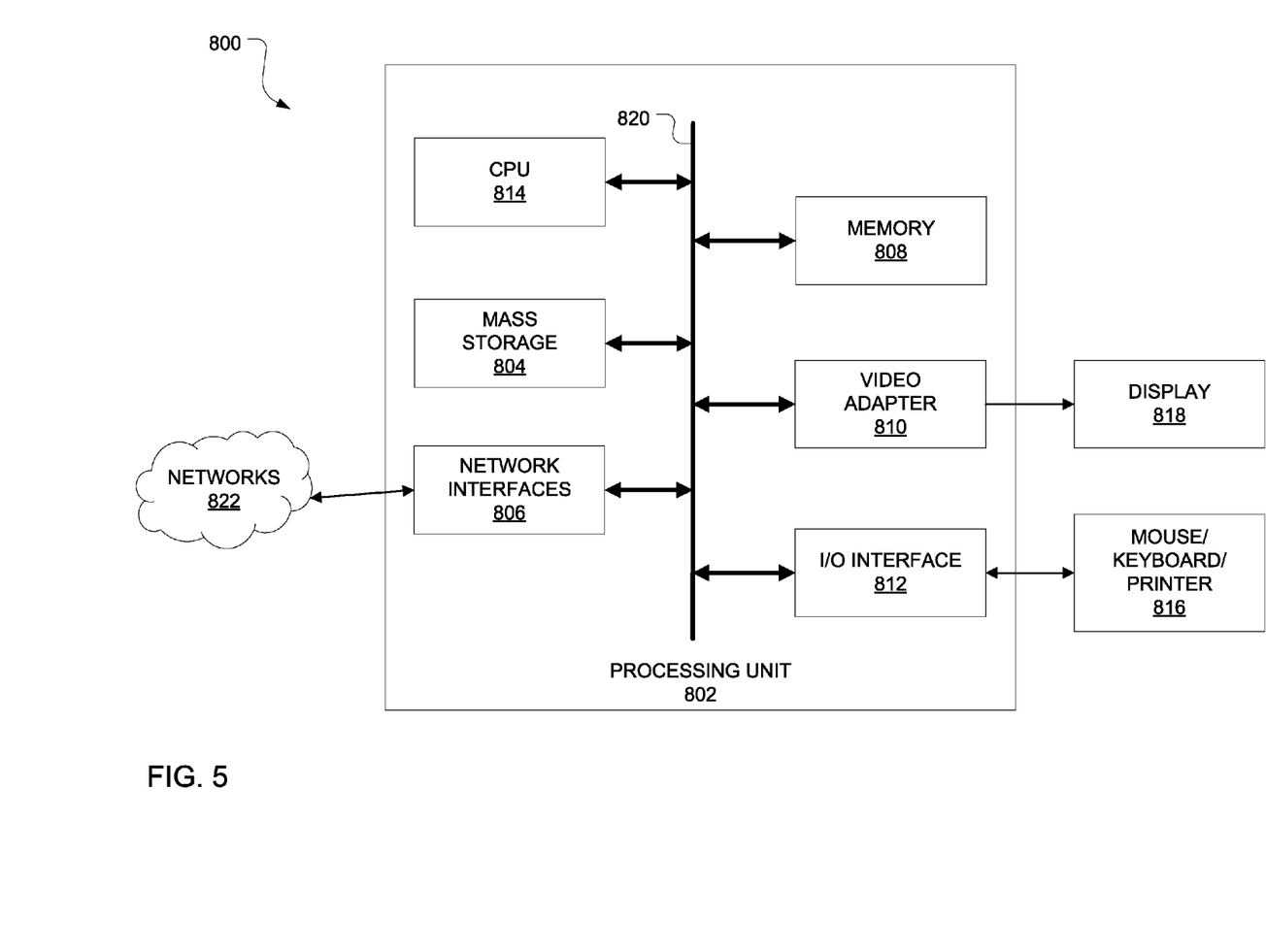
FIG. 5 is a block diagram of one embodiment of a computing system.

FIG. 5 is a block diagram of a computing system 500 that may be used for implementing the devices and methods disclosed herein. Specific devices may utilize all of the components shown or only a subset of the components. Levels of integration may vary from device to device. Furthermore, a device may contain multiple instances of a component, such as multiple processing units, processors, memories, transmitters, receivers, etc. The computing system 500 may comprise a processing unit 502 equipped with one or more input/output devices, such as a speaker, microphone, mouse, touchscreen, keypad, keyboard, printer, display, and the like. The processing unit may include a central processing unit (CPU) 514, memory 508, a mass storage device 504, a video adapter 510, and an I/O interface 512 connected to a bus 520.

The bus 520 may be one or more of any type of several bus architectures including a memory bus or memory controller, a peripheral bus, video bus, or the like. The CPU 514 may comprise any type of electronic data processor. The memory 508 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 508 may include ROM for use at boot-up, and DRAM for program and data storage for use while executing programs.

The mass storage 504 may comprise any type of non-transitory storage device configured to store data, programs, and other information and to make the data, programs, and other information accessible via the bus 520. The mass storage 504 may comprise, for example, one or more of a solid state drive, hard disk drive, a magnetic disk drive, an optical disk drive, or the like.

The video adapter 510 and the I/O interface 512 provide interfaces to couple external input and output devices to the processing unit 502. As illustrated, examples of input and output devices include a display 518 coupled to the video adapter 510 and a mouse/keyboard/printer 516 coupled to the I/O interface 512. Other devices may be coupled to the processing unit 502 and additional or fewer interface cards may be utilized. For example, a serial interface such as Universal Serial Bus (USB) (not shown) may be used to provide an interface for a printer.

The processing unit 502 also includes one or more network interfaces 506, which may comprise wired links, such as an Ethernet cable or the like, and/or wireless links to access nodes or different networks. The network interfaces 506 allow the processing unit 502 to communicate with remote units via the networks. For example, the network interfaces 506 may provide wireless communication via one or more transmitters/transmit antennas and one or more receivers/receive antennas. In an embodiment, the processing unit 502 is coupled to a local-area network 522 or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of global scope basic-block reordering, comprising:
    profiling an application having a source code decomposable into a plurality of basic-blocks, wherein the profiling yields a global basic-block sequence;
    generating a hierarchical locality model according to the global basic-block sequence, wherein the hierarchical locality model represents the plurality of basic blocks and affinities of each basic block of the plurality of basic blocks to one or more other basic blocks of the plurality of basic blocks, and wherein an affinity between a pair of basic blocks represents the smallest number of calls of basic blocks needed to traverse between basic blocks of the pair during execution; and
    generating a target code according to the hierarchical locality model.

2. The method of claim 1 wherein the generating the hierarchical locality model and the generating the target code are carried out at a compile-time.

3. The method of claim 1 wherein the profiling comprises:
    inserting instrumentation code into an intermediate representation of the source code;
    generating a testing code according to the intermediate representation; and
    executing the testing code, wherein the executing generates global basic-block execution traces corresponding to the plurality of basic-blocks.

4. The method of claim 3 wherein the profiling further comprises:
    collecting the global basic-block execution traces; and
    sampling the global basic-block execution traces.

5. The method of claim 4 wherein the profiling further comprises forming the global basic-block sequence according to samples of the global basic-block execution traces.

6. The method of claim 3 wherein the global basic-block execution traces comprise respective basic-block information.

7. The method of claim 6 wherein the respective basic-block information includes a basic-block name.

8. The method of claim 1 wherein the generating the hierarchical locality model comprises determining the affinity between each unique pair of the plurality of basic-blocks according to the global basic-block sequence.

9. The method of claim 8 wherein the determining the affinity comprises using the global basic-block sequence to find a minimum count of distinct basic-block calls between each unique pair of the plurality of basic-blocks.

10. The method of claim 8 wherein the generating further comprises grouping the plurality of basic-blocks according to respective affinity values for corresponding pairs.

11. A non-transitory computer readable medium having computer executable instructions for a compiler, the compiler comprising:
    a first stage configured to translate a source code having a plurality of basic-blocks into an intermediate representation;
    an optimizer configured to:
        profile the intermediate representation, wherein profiling yields a global basic-block sequence, and
        generate a hierarchical locality model according to the global basic-block sequence, wherein the hierarchical locality model represents the plurality of basic blocks and affinities of each basic block of the plurality of basic blocks to one or more other basic blocks of the plurality of basic blocks, and wherein an affinity between a pair of basic blocks represents the smallest number of calls of basic blocks needed to traverse between basic blocks of the pair during execution; and
    a code generator configured to generate a target code ordered according to the hierarchical locality model.

12. The non-transitory computer readable medium of claim 11 wherein the first stage comprises:
    a scanner configured to lexically analyze the source code to generate a sequence of tokens;
    a parser configured to parse the sequence of tokens into a syntax tree; and
    a semantic analyzer configured to contextually analyze and annotate the syntax tree to generate the intermediate representation.

13. The non-transitory computer readable medium of claim 11 wherein the optimizer comprises a profiler having:

a compile-time module configured to insert instrumentation code into the intermediate representation; and a run-time module configured to generate global basic-block execution traces corresponding to the plurality of basic-blocks during execution of a testing code generated according to the intermediate representation and including the instrumentation code.

14. The non-transitory computer readable medium of claim 13 wherein the code generator is further configured to generate the testing code according to the intermediate representation and the instrumentation code.

15. The non-transitory computer readable medium of claim 13 wherein the compile-time module is further configured to:

take samples of the global basic-block execution traces; and generate the global basic-block sequence according to the samples.

16. The non-transitory computer readable medium of claim 11 wherein the optimizer comprises a modeler configured to:

determine an affinity between each unique pair of the plurality of basic-blocks according to the global basic-block sequence; and group the plurality of basic-blocks according to respective affinity values for corresponding pairs of the plurality of basic-blocks.

17. The non-transitory computer readable medium of claim 16 wherein the modeler is further configured to use the global basic-block sequence to find a minimum count of distinct basic-block calls between each unique pair of the plurality of basic-blocks to determine the affinity.

18. A computing system, comprising:

a non-transitory memory configured to store:

a source code decomposable into a plurality of basic-blocks, an intermediate representation of the source code, a testing code generated according to the intermediate representation and including instrumentation code, a hierarchical locality model representing respective affinities between each unique pair of the plurality of basic-blocks, wherein an affinity between the unique pair of basic blocks represents the smallest number of calls of basic blocks needed to traverse between basic blocks of the unique pair during execution, and a target code generated according to the intermediate representation and the hierarchical locality model; and a processor configured to:

translate the source code into the intermediate representation, insert the instrumentation code into the intermediate representation, generate and execute the testing code, collect global basic-block execution traces resulting from the execution of the testing code, determine the respective affinities according to the global basic-block execution traces to generate the hierarchical locality model, and generate the target code.

19. The computing system of claim 18 wherein the memory is further configured to store the global basic-block execution traces according to a basic-block information data structure.

20. The computing system of claim 19 wherein the basic-block information data structure includes:

a basic-block name;

a basic-block label; and a basic-block position.

* * * * *